(12) United States Patent
Joshi et al.

(10) Patent No.: US 9,648,615 B2
(45) Date of Patent: May 9, 2017

(54) LOCATION MEASUREMENT OPTIMIZED OFF-CHANNEL SCANNING AND GROUPING OF ACCESS POINTS

(71) Applicant: Cisco Technology, Inc., San Jose, CA (US)

(72) Inventors: Shaunak Joshi, Mountain View, CA (US); Paul J. Stager, Akron, OH (US); Brian D. Hart, Sunnyvale, CA (US); Santosh Pandey, Newark, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 146 days.

(21) Appl. No.: 14/558,200

(22) Filed: Dec. 2, 2014

(65) Prior Publication Data

US 2016/0157225 A1   Jun. 2, 2016

(51) Int. Cl.
    *H04W 72/04* (2009.01)
    *H04W 64/00* (2009.01)
    *H04W 4/02* (2009.01)

(52) U.S. Cl.
    CPC ......... *H04W 72/0446* (2013.01); *H04W 4/02* (2013.01); *H04W 64/00* (2013.01)

(58) Field of Classification Search
    CPC ... H04W 28/04; H04W 72/04; H04W 72/042; H04W 88/08
    See application file for complete search history.

(56) References Cited

U.S. PATENT DOCUMENTS

| 2005/0197136 | A1  | 9/2005 | Friday et al. |
| 2007/0010261 | A1* | 1/2007 | Dravida ............... G01S 5/0009 455/456.3 |
| 2014/0080491 | A1  | 3/2014 | Tinnakornsrisuphap et al. |
| 2014/0235266 | A1  | 8/2014 | Edge et al. |

FOREIGN PATENT DOCUMENTS

| WO | 2012075052 A1 | 6/2012 |
| WO | 2012166355 A1 | 12/2012 |

OTHER PUBLICATIONS

International Search Report and Written Opinion in corresponding International Application No. PCT/US2015/041653, mailed Oct. 29, 2015, 12 pages.

* cited by examiner

*Primary Examiner* — Maharishi Khirodhar
*Assistant Examiner* — Sanjay K Dewan
(74) *Attorney, Agent, or Firm* — Edell, Shapiro & Finnan, LLC (57) ABSTRACT

A plurality of time slots are allocated during which a location procedure is performed for one or more target wireless devices. Select ones of a plurality of wireless access points at different positions are assigned to each time slot such that multiple wireless access points assigned to a given time slot are sufficiently separated. In addition, wireless access points are assigned to a corresponding one of a plurality of groups for each time slot such that wireless access points assigned to a group tune to a channel used by a wireless access point in the group that transmits one or more frames that are intended to provoke one or more response frames from the one or more wireless devices.

24 Claims, 10 Drawing Sheets

LOCATION MEASUREMENT OPTIMIZED OFF-CHANNEL SCANNING AND GROUPING OF ACCESS POINTS

TECHNICAL FIELD

The present disclosure relates to locating wireless devices.

BACKGROUND

In wireless communication applications, it is desirable to locate various wireless devices, such as wireless client devices operating in a wireless local area network. In order to locate one or more wireless client devices, multiple wireless access points need to be tuned to the same channel as the target wireless client devices in order to receive transmissions from the target devices. When there are numerous channels on which wireless clients may be operating, and numerous wireless access points in a given deployment, timely obtaining reliable location information for wireless client devices can be challenging.

DESCRIPTION OF EXAMPLE EMBODIMENTS

Overview

In one embodiment, a plurality of time slots are allocated, during which a location measurement procedure may be performed for one or more wireless devices. An assignment is made to each time slot for select ones of a plurality of wireless access points at different positions such that multiple wireless access points assigned to a given time slot are sufficiently separated. During a given time slot, the wireless access point assigned to the given time slot transmits one or more frames that are intended to provoke the one or more wireless devices to transmit one or more response frames. An assignment is made of wireless access points to a corresponding one of a plurality of groups a plurality of wireless access points for each time slot such that wireless access points assigned to a group tune to a channel used by the wireless access point which transmits the one or more frames that are intended to provoke the one or more response frames, and such that the wireless access points in a given group are at positions with respect to the wireless access point that transmits the one or more frames that are intended to provoke the one or more responses frames so as to receive one or more response frames from each of the one or more wireless devices.

Example Embodiments

Off-channel scanning schemes are used in capable Wi-Fi® wireless access points to scan a fixed channel list as specified by settings on a wireless network controller. The channel list can be configured statically according to three options: all valid channels in band(s); country-allowed list; or manually set depending on the channels of interest in the 2.4 GHz or 5 GHz bands. This static channel scanning scheme has several disadvantages. First, it is unaware of the channels assigned to a particular group of APs in a region of an AP placement map. Second, it does not take into account changes in the placement of APs and channel assignments of neighboring APs.

This static channel assignment scheme is also not suited for time-scheduled location measurements (where resources are coordinated across multiple access points in order to make accurate location measurements) because it lacks the intelligence needed to minimize time slot contention for time-allotted measurement resources. In addition, the existing scheme does not have the time synchronization necessary to provide accurate time-scheduled location measurements. The lack of awareness of access point infrastructure deployment leads to high location latency since specific channels of interest to a group of APs are revisited at a very low rate, resulting in slower wireless client location updates.

A system and method are presented herein to ensure minimal contention for time-scheduled resources for location measurements while achieving reduced location latency by scanning only the channels of interest. In other words, these techniques minimize time slot contention for location resources, while providing coordination to ensure a sufficient number of neighboring wireless access points for reliably measuring the location of wireless devices. These techniques are agnostic to the type of underlying time-based location measurement scheme employed, and thus are applicable to all location techniques that depend on resource coordination across multiple access points.

Figure 1:
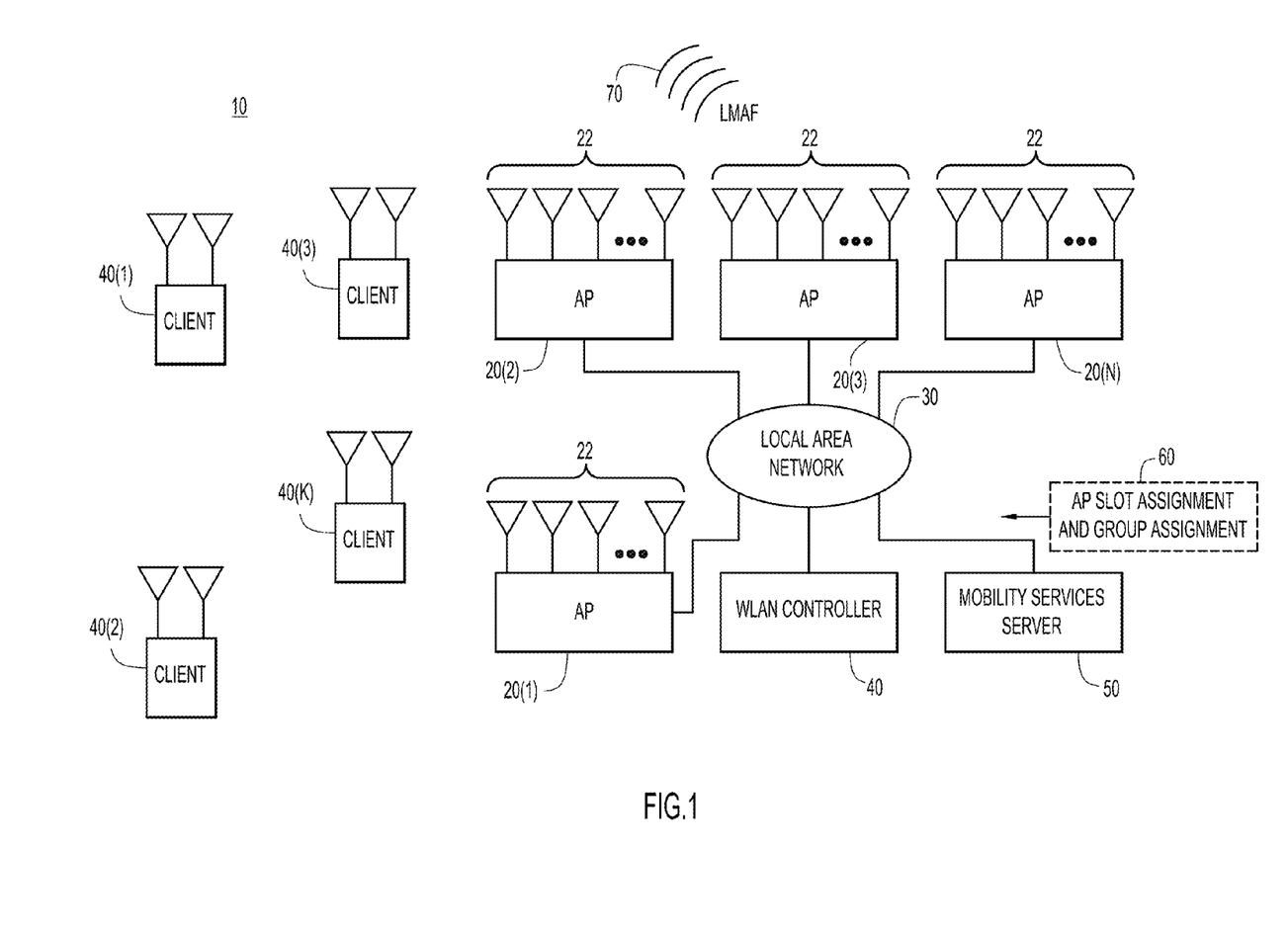
FIG. 1 is a block diagram of a wireless network environment including a plurality of wireless access points and wireless client devices, and in which the channel scanning techniques presented herein may be employed according to an example embodiment.

Reference is made to FIG. 1. FIG. 1 illustrates a network environment 10 that supports wireless network capability, such as a Wi-Fi® wireless local area network (WLAN). To this end, there are multiple wireless access points (APs), shown at reference numerals 20(1)-20(N). The APs support WLAN connectivity for multiple wireless client devices (also called "clients" herein) shown at reference numerals 40(1) and 40(2). It should be understood that FIG. 1 is only a simplified example. There may be numerous more clients in a real network deployment. Moreover, for some applications, there may be only a single AP in a deployment. Each of the APs 20(1)-20(N) has a plurality of antennas or an array of antenna elements, shown collectively at reference numeral 22. The number of antennas at each AP may vary. In one example, there are 1, 2, 4, 8, 16 or 32 antenna elements at each AP.

There is back-end infrastructure that is used for control and other functions of the WLAN. Specifically, the APs 20(1) and 20(2) connect to a wired local area network 30 to which are also connected a WLAN controller 40 and a mobility services server 50. The WLAN controller 40 performs control functions for the APs 20(1)-20(N) and clients 40(1)-40(k) as described further hereinafter. In addition, and as described in more detail hereinafter, the mobility services server 50 performs, among other things, location functions to track the locations of clients based on data gathered from signals received at one or more APs (or at other wireless devices at fixed locations). The WLAN controller 40 and mobility services server 50 may reside on the same physical apparatus, or may be applications running on a data center. Thus, both the WLAN controller 40 and mobility services server 50 are not required in order to perform the techniques presented herein.

As shown in FIG. 1, there are numerous clients 40(1)-40(k) whose location may need to be determined at some point in time. Techniques are presented herein to coordinate the APs 20(1)-20(N) so that certain APs at positions within the same local area (a section of a building, a floor of a building, etc.) are grouped together and scan a specific list of channels. In other words, a goal of the techniques presented herein is to determine which channels a group of APs should scan, and which APs should be in a given group in order to locate certain clients.

The mobility services server 50 generates data indicating AP time slot assignment and AP group assignment. This data is shown at reference numeral 60 in FIG. 1. The mobility services server 50 sends this data either directly into the network 30 to the APs 20(1)-20(N) or indirectly through the WLAN controller 40 to the APs 20(1)-20(N). Moreover, the WLAN controller 40 could generate and disseminate the data 60. The AP slot assignment and AP group assignment data 60 are described in more detail below. Using the AP slot assignment and AP group assignment data 60, for a given group of APs, a particular AP will transmit a Location Measurement Announcement Frame (LMAF). As an example FIG. 1 shows that AP 20(3) is transmitting an LMAF 70. The LMAF 70 is broadcast for reception by neighboring APs, and the LMAF 70 includes information indicating a list of clients that should be located by all neighboring APs (e.g., AP 20(2), etc.) that are synchronously listening to the same channel as the AP that transmitted the LMAF 70. Furthermore, neighboring APs have knowledge on which particular transmitting AP to listen to, therefore discarding LMAFs received from other APs transmitting in the same particular slot. Further still, in one embodiment, the LMAF is not needed, as described below.

Figure 2:
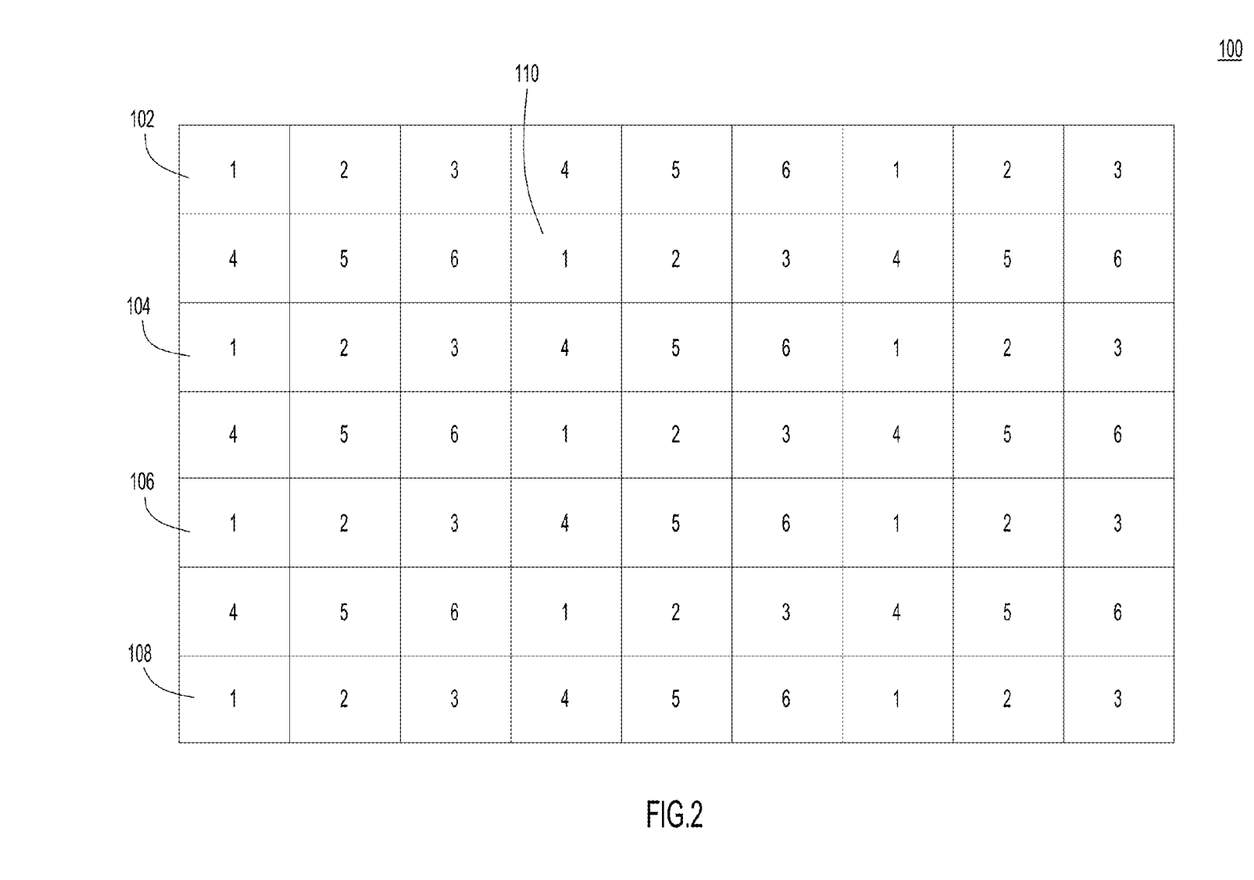
FIG. 2 is a diagram depicting a transmit time slot assignment scheme for wireless access points according to an example embodiment.

Reference is now made to FIG. 2. FIG. 2 illustrates a grid 100 and each block of the grid 100 represents an AP. Thus, in a given deployment, there may be a plurality of APs arranged in a grid-like fashion. The number in each block corresponds to an assigned time slot in a sequence of time slots. In the example of FIG. 2, there are 6 time slots (1-6). APs at grid locations with a "1" are assigned to time slot 1, APs at grid locations with a "2" are assigned to time slot 2, and so on. The diagram of FIG. 2 is a graphical representation of an example time slot assignment scheme. It should be understood that APs need not be placed in a grid-like fashion and there may be more or fewer time slots in a given deployment.

During a given time slot, all APs assigned to that time slot transmit an LMAF to initiate a location procedure during that time slot. During time slot 1, for example, the APs at grid locations 102, 104, 106, 108, and 110 (as well as other APs at grid locations with a "1") will all transmit an LMAF to initiate a location procedure for one or more clients in their respective local areas. Similarly, during time slot 2, the APs at all grid locations with a "2" transmit an LMAF to initiate a location procedure for one or more clients in their respective local areas.

Transmit Slot Assignment

As shown in FIG. 2, a transmission time slot is assigned to each AP and the assignments are made to separate the transmission time slots such that there is minimum contention between APs that are transmitting in the same time slot thereby also facilitating the easier grouping during Group Assignment, described below. An assigned slot means an AP transmits information to enable a location measurement during that time slot. Again, the main goal of assigning APs to time slots is to separate transmitting/active APs assigned to the same time slot as much as possible given a certain number of transmission time slots.

The AP transmit slot assignments are made to ensure that transmit/active APs (within a group of measuring APs that operate on the same channel) are well separated (for wireless signal propagation purposes) from each other. APs may be immediately above one another on different floors of a building, and even separated by a thick floor, but still may not be sufficiently separated for purposes of wireless (radio frequency) signal propagation. Thus, the APs that are assigned to transmit during the same time slot need to be sufficiently separated according to a physical location, pathloss (radio frequency signal propagation) or a hybrid of physical location and pathloss characteristics. This reduces the probability that neighboring APs will compete for time-scheduled location resources from the same neighboring APs. In other words, if there is sufficient separation between transmitting APs assigned to the same time slot, then the transmitting APs assigned to the same time slot will not be competing to have included in their group (as described below) the same neighboring APs. The grouping of APs is described below in conjunction with FIGS. 4 and 5.

Figure 3:
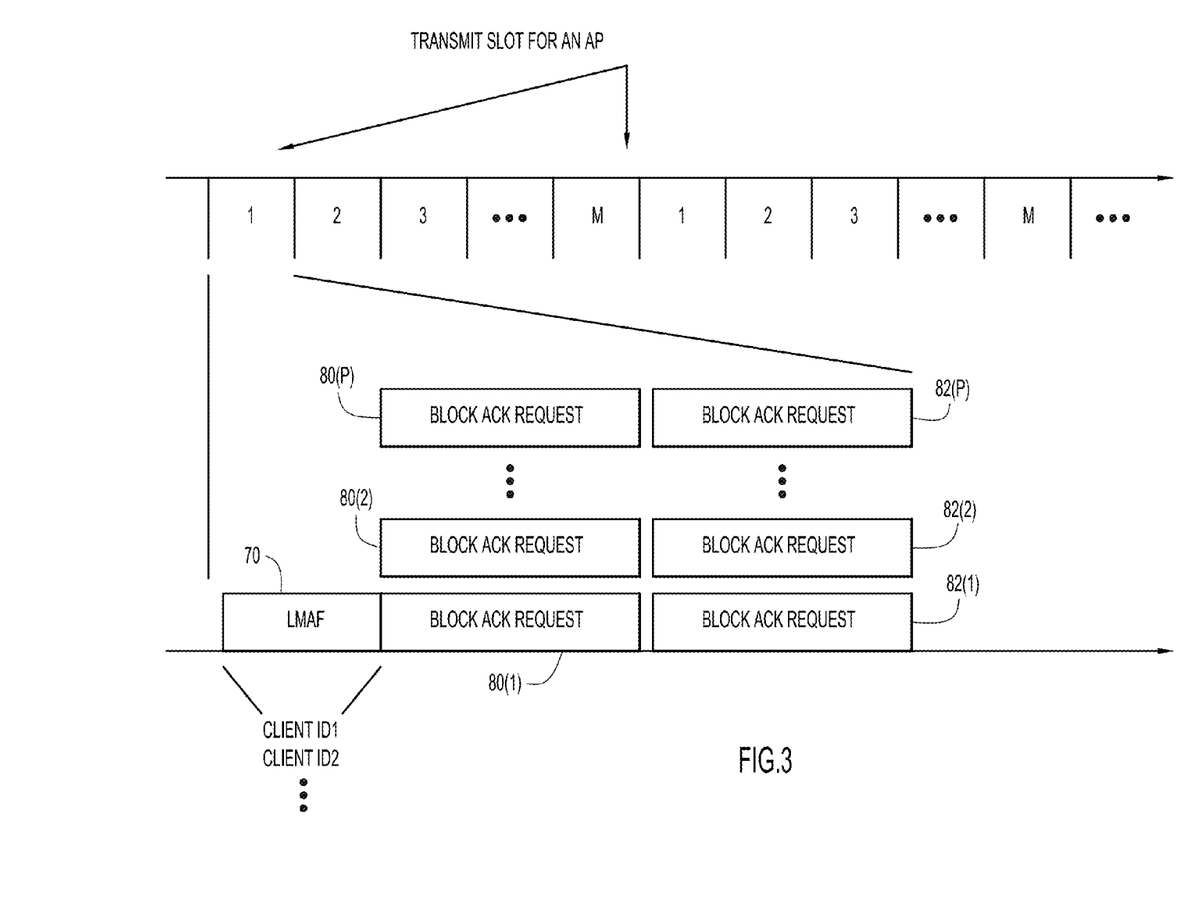
FIG. 3 is a diagram illustrating an announcement frame and other signals transmitted during a transmit time slot, according to an example embodiment.

Reference is now made to FIG. 3 for a more detailed description of the signals occurring during a transmit slot. In one embodiment, the AP transmit slot assignment is done using a contention resolution scheme where each AP is assigned a time slot to transmit an LMAF and initiate time-scheduled measurements for client location. FIG. 3 shows that there is a sequence of transmit slots, numbered 1 through M. After the Mth time slot, the sequence repeats from time slot 1, and so on. Thus, a plurality of time slots is allocated during each of which a location measurement procedure is performed for one or more target wireless devices.

The active AP assigned for a given transmission slot (called an "active AP" or "transmitting AP") sends an LMAF that contains information indicating the clients for which locations measurements are desired. The neighboring APs in a group assigned for that time slot listen for the LMAF to learn for which clients the neighboring APs should receive signals. The assignment of APs to groups is described further below. The transmitting AP then sends a message to those clients (e.g., a Block ACK Request) to provoke the clients to respond with a frame that is received by all of the neighboring APs in that group. This is described further below. The reception of that response frame embodies the location measurement information used to compute the location of the one or more clients.

Specifically, in one form, the AP assigned to that time slot transmits an LMAF 70, followed by one or more frames to provoke a response from each of one or more wireless client devices whose location is to be determined. The LMAF 70 includes identifiers for one or more wireless client devices whose location is to be determined, i.e., Client ID1, Client ID2, . . . , as shown in FIG. 3. The client identifier may take the form of a media access control (MAC) address, IP address, etc., for each target wireless client device.

Following the LMAF 70, the active AP transmits one or more frames that are intended to provoke the one or more target wireless devices to transmit one or more response frames. In one example, the frame intended to provoke a wireless device to transmit a response frame is a Block Acknowledgement (ACK) Request frame in accordance with the IEEE 802.11 wireless communication standard. The response frame may be a Block ACK Response in accordance with the IEEE 802.11 wireless communication standard. A Block ACK Request identifies a particular wireless client device such that only that one wireless client device transmits a Block ACK Response to that Block ACK Request. Thus, FIG. 3 shows that there are Block ACK Request frames 80(1)-80(P) and Block ACK Response frames 82(1)-82(P). Each Block ACK Request frame 80(i) has a corresponding Block ACK Response frame 82(i) for target wireless client device (i). For example, a Block ACK Request frame 80(1) is sent for a wireless client device with Client ID1 and that wireless client device responds with a Block ACK Response frame 82(1), a Block ACK Request frame 80(2) is sent for a wireless client device with Client ID2 that responds with a Block ACK Response frame 82(2), and so on.

As mentioned above, in one embodiment, the transmitting/active AP need not send the LMAF 70. Instead, the active/transmitting AP only sends one or more frames to provoke one or more client devices to transmit response frames to facilitate measurements based on reception of the response frames (and perhaps the provocation frames transmitted by the active/transmitting AP). If APs have enough memory and sufficient hardware capabilities, then they can receive and store data for response frames sent by all client devices that are in proximity.

In assigning APs to transmit slots, a cost metric for each AP is computed as follows. The cost metric is proportional to a pathloss between APs in the system that are using the same transmit slot (the inverse square of the distance between APs). This is done to ensure neighboring APs are not transmitting on the same time slot. Real pathloss calibrated/measured from the environment around the APs may be used instead of square-law pathloss. The cost metric increases proportionally if more APs in the system are assigned to a given time slot, in order to minimize overall slot contention.

Figure 4:
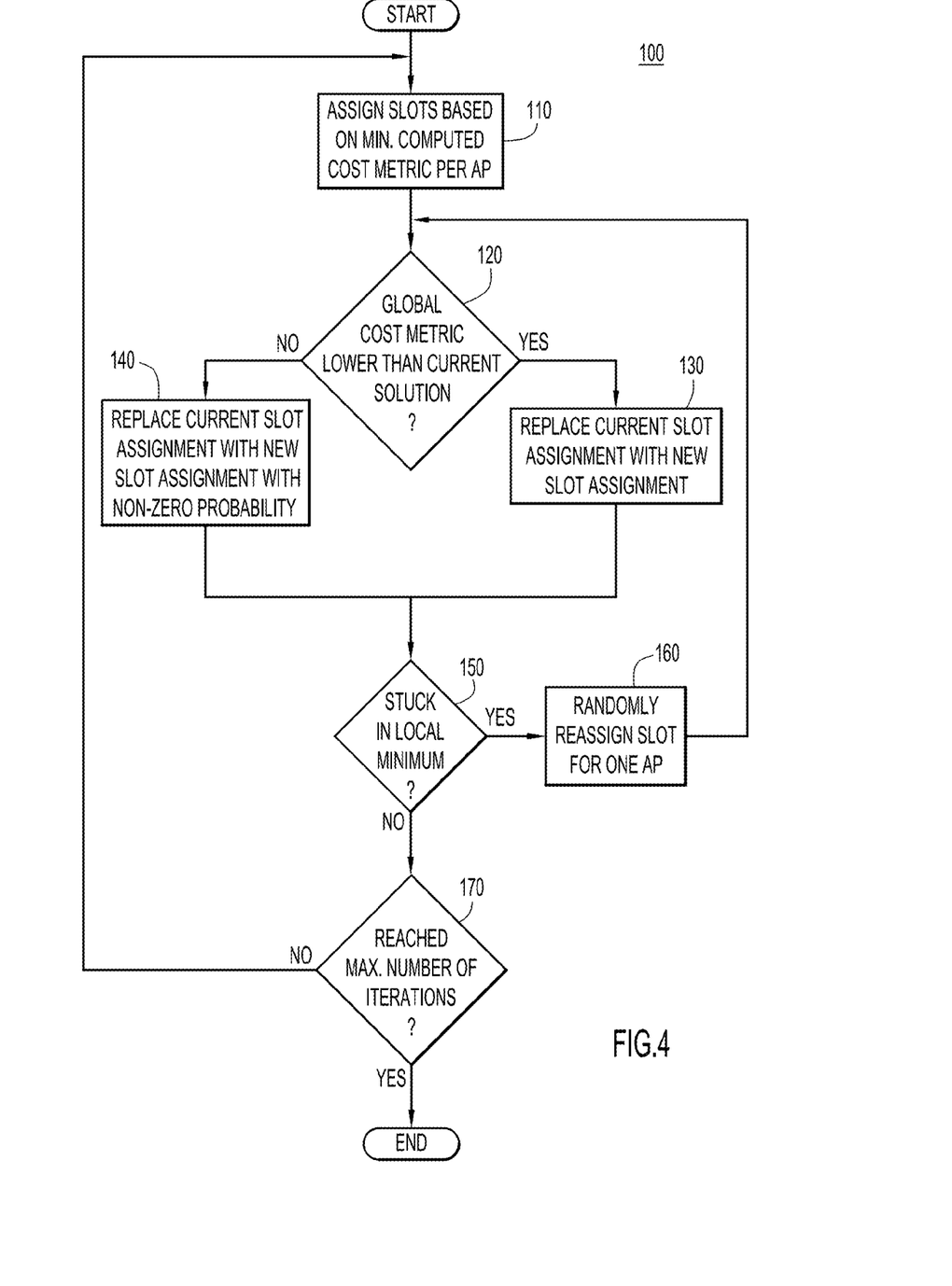
FIG. 4 is a flow chart of a process for determining an optimum transmit time slot assignment for wireless access points, according to an example embodiment.

Reference is now made to FIG. 4 for description of a flow chart of a process 100 for assigning APs to transmit time slots. At 110, APs are assigned a transmit slot from 1 to X depending on which slot minimizes the cost metric for that AP. A global cost metric is computed as the sum of each individual cost metric of all APs in the system. At 120, it is determined whether the global cost metric is lower than the metric for the current assignment scheme/solution. If the global cost metric is less than the metric for the current assignment scheme/solution, the current slot assignment is replaced with a new slot assignment at 130. On the other hand, if the global cost metric is greater than the metric for the current assignment scheme/solution, then at 140, the current slot assignment scheme is replaced with a new slot assignment scheme with non-zero probability.

This global metric is then minimized using a simulated annealing heuristic over several iterations. If, at 150, it is determined that the cost metric for the system is found in a local minimum, the slot assignment of a single AP is randomly altered and the metric is recomputed at 160. The process then repeats from 120. The transmit slot assignment scheme is chosen as that with minimum cost found over several iterations, as indicated at 170.

The number of slots, X, ultimately determines the location latency since it dictates the number of scans in an off-channel scan cycle and therefore affects the return time to a particular channel. Hence, the rate of update for time-scheduled location computations for clients on that particular channel is proportional to X.

Therefore, during step 110, it is desirable to assign APs to time slots such that adjacent APs are not transmitting on same slot and not competing for same channel resources. The best assignment scheme is then arrived at based on certain metrics.

Pseudo-code to represent the heuristic for modified simulated annealing for transmit slot assignment is as follows.

For each iteration i
    For every AP, check slots k=1... num_slots (K)
      Assign slot with min. cost metric
      Cost metric ~ $1/r^2$ + weight_penalty (how many APs already assigned), where $1/r^2$ is a free space path loss.
      Calculate sum of cost metric for all APs on same slot as global metric
Do Simulated Annealing
    If cost(i+1) < cost(i)
      accept state
    else
      accept (worse) state w.p p_acc
    Random perturbation: Check if cost_metrics in a window are constant (in a local min.), randomly change the slot for a randomly chosen AP.

As an example, a matrix is shown below that represents the cost metrics proportional to the free space pathloss=$1/r^2$, (where $r^2$ represents the distance between two APs) for a set of APs placed on a single axis). In this example, APs are each separated by 50 ft, therefore APs 1-5 are placed at (x,y) of (0,50), (0,100), (0,150), (0,200) and (0,250) respectively. The entry in each cell of the table below represents the proportional free space pathloss between each AP. The weight penalty is added to this value when computing the final cost metric.

|     | AP1  | AP2  | AP3  | AP4  | AP5  |
| --- | ---- | ---- | ---- | ---- | ---- |
| AP1 | 0.00 | 40.00 | 10.00 | 4.44 | 2.50 |
| AP2 | 40.00 | 0.00 | 40.00 | 10.00 | 4.44 |
| AP3 | 10.00 | 40.00 | 0.00 | 40.00 | 10.00 |
| AP4 | 4.44 | 10.00 | 40.00 | 0.00 | 40.00 |
| AP5 | 2.50 | 4.44 | 10.00 | 40.00 | 0.00 |

Group Assignment

APs are assigned to a group such that those APs in the group tune to the channel that the corresponding AP assigned to that time slot is operating on (the serving channel) for a group location measurement session. A grouping scheme is provided to group APs such that there are a sufficient number of well-positioned neighboring APs for a location measurement session to achieve an accurate location measurement, per transmit slot, while also minimizing contention for APs to be assigned to a particular group. In other words, the grouping is made so that there are APs in a given group at positions with respect to the transmitting AP in that group so as to receive the one or more response frames from the one or more wireless devices to be located. The positions of the non-transmitting AP in a given group just need to be sufficiently proximate to the transmitting AP for that group in order to receive the response frames from the wireless devices to be located. It is possible, therefore, that APs assigned to a given group may be on the same floor or on different floors of a building.

Figure 5:
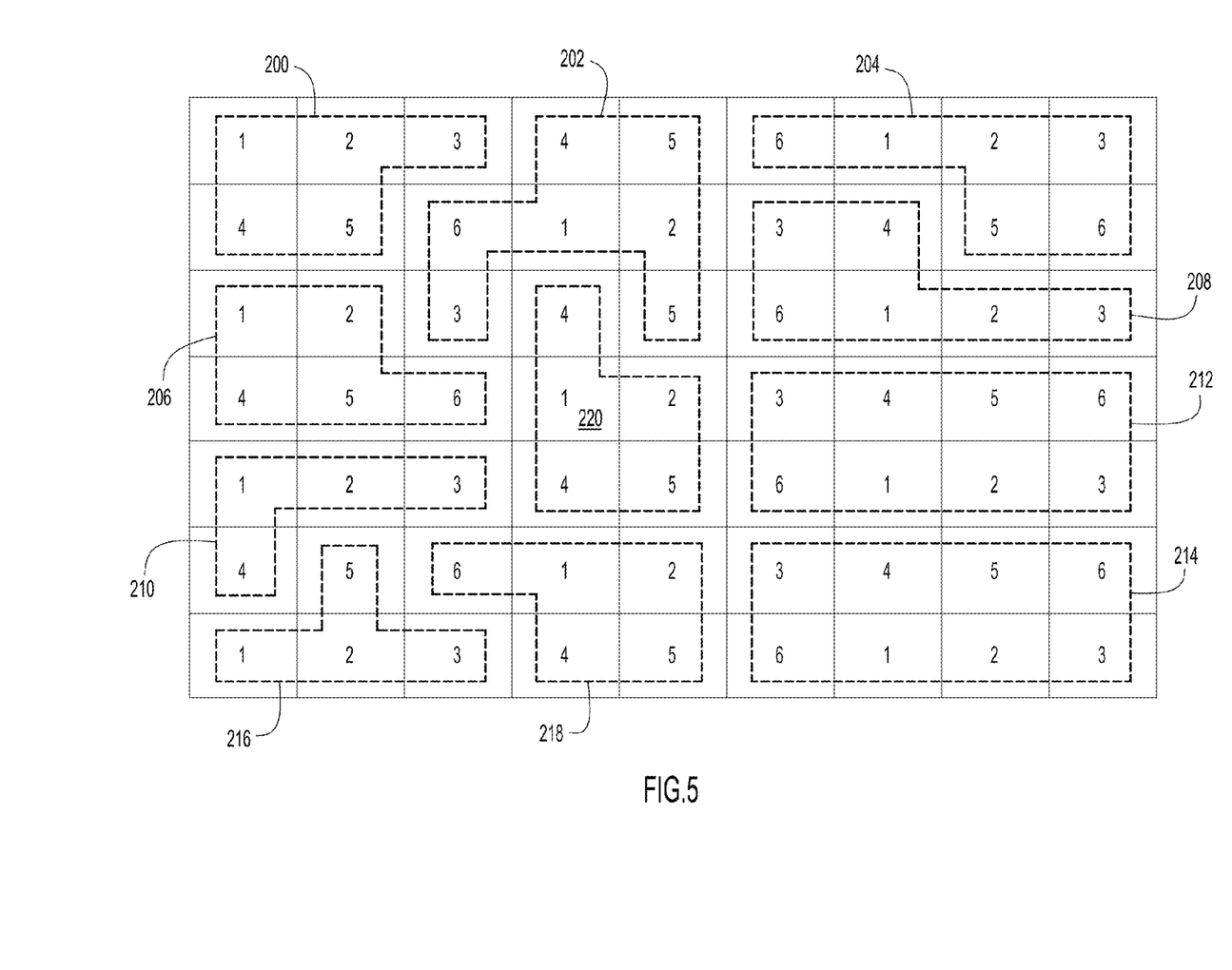
FIGS. 5 and 6 are diagrams illustrating groupings of wireless access points for different time slots, according to example embodiments.
Figure 6:
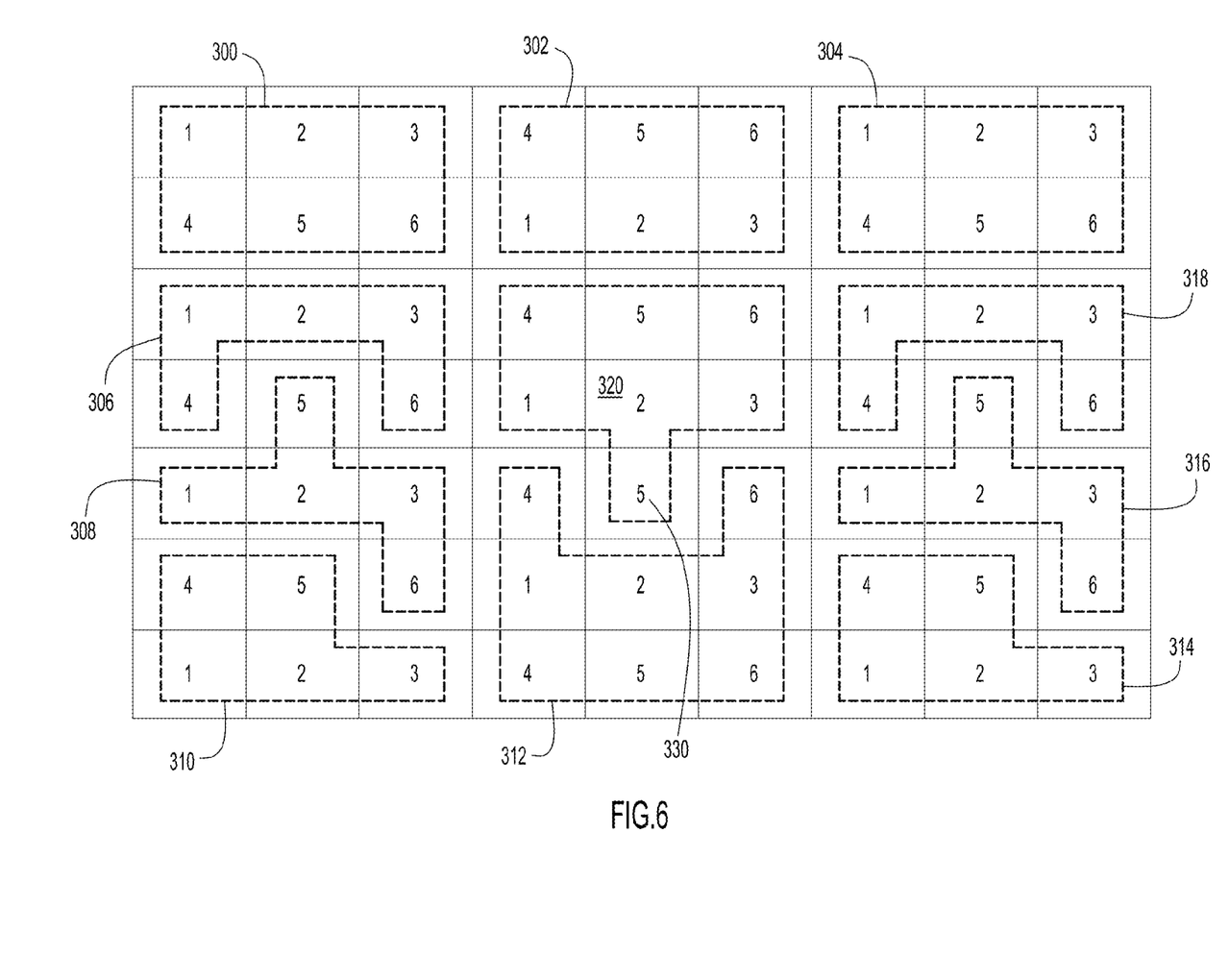

FIGS. 5 and 6 illustrate examples of AP group assignments. For example, FIG. 5 illustrates AP group assignment for an arbitrary time slot, e.g., time slot 1. FIG. 5 shows AP groups 200, 202, 204, 206, 208, 210, 212, 214, 216, 218 and 220. In the example of FIG. 5, since this grouping is for time slot 1, only the APs at the grid locations in each group with a "1" will transmit an LMAF to initiate a location procedure. Notice that there is separation of at least one grid between APs that are assigned to time slot 1 and will transmit an LMAF during time slot 1.

The AP group assignment for different time slots is not the same. FIG. 6 illustrates AP group assignment for another time slot, e.g., time slot 2. There are AP groups 300, 302, 304, 306, 308, 310, 312, 314, 316, 318 and 320. Only the APs at grid locations in each group with a "2" will transmit an LMAF to initiate a location procedure during time slot 2. Again, there is separation of at least one grid spacing between APs that are assigned to time slot 2 and that will transmit an LMAF during time slot 2.

When assigning APs to a group, one goal is not to assign too many APs to one group and not enough APs to another group. It is important that the AP that is transmitting has a sufficient number of APs in its group in all directions in order to obtain good location measurement data, that is, a uniform grid that surrounds that transmitting AP. This is akin to a center of mass about the transmitting AP. The size of the group is not necessarily the same for all AP groups during any given time slot. This depends on the clients to be located at a given transmit slot (e.g., location measurement session). Grouping of the APs changes from slot to slot because the position of the AP that is active in that slot is not the same, which means that the optimal grouping from slot to slot may not be the same.

In one embodiment, by assigning non-transmitting APs to a group, and specifying which AP transmits the LMAF to the target devices which are to be located during a time slot, the non-transmitting APs in a group are informed of the channel to which they should tune to in order to receive the LMAF and other frames in the location procedure. The channel information and the MAC address of the transmitting AP may be explicitly included in the time slot and AP group assignment data that the mobility services server sends to the APs. For example, the mobility services server may send an array of (channel_i, MAC_i) to each AP representing the channel to tune to in slot i and also the MAC address of the transmitting AP to honor only its LMAF in slot i, for i=1 . . . N slots. In a variation on this, the channel information can be inferred as the AP grouping includes the transmitting AP and the neighboring APs can obtain the transmitting AP's channel on their own.

Each measuring AP is grouped by surrounding neighboring APs (possibly including APs on multiple floors) that intelligently and synchronously switch channels to the same operating channel as that of the AP that transmits the LMAF in order to receive the transmitted LMAF, and subsequently perform time-scheduled location calculations for clients of interest specified in the LMAF based on the provocation frames sent by the transmitting AP and the response frames transmitted by the wireless devices to be located. This AP grouping may be similar to forming a convex hull grouping of APs in order to determine accurate location for clients within this convex hull.

Another cost metric is generated to ensure that only neighboring APs that are not transmitting in a particular time slot are grouped with a single measuring AP. This cost metric for each of the X transmit slots is based on several factors as listed below:

(a) The proximity of non-transmitting APs to multiple transmitting APs, and possible contention with respect to transmitting AP grouping.

(b) Highly contentious neighboring APs in close proximity to multiple non-transmitting APs are assigned to a group with highest priority by lowering their cost of assignment. For example, the AP at grid location 330 in FIG. 6 may be deemed a "highly contentious AP".

(c) The number of neighboring APs currently assigned to a transmitting AP. The cost metric for incrementally assigning APs is increased to prevent over-assignment of measuring AP groups. For the transmitting AP, the penalty for including APs can be reduced for APs in regions where location accuracy should be better than other regions. Areas targeted as regions requiring better location accuracy can be predetermined at deployment or determined dynamically in real-time based on client association statistics or instantaneous client association. By reducing this penalty for a particular transmitting AP, more APs can be included in the group for the particular transmitting AP. More APs in the group means more APs to make measurements from transmissions from client devices. Greater location accuracy can be achieved with more measurement data. In another words, the computation of the second cost metric is adjusted to allow for a greater number of neighboring wireless access points to be assigned to a given group at a location/position where (or for certain wireless devices for which) greater location accuracy is desired.

(d) The individual contribution of a neighboring AP to the center of mass of the group of APs, and the distance of the center of mass to the actual position of an AP utilizing a transmit slot. Ideally, a group of APs will be chosen such that the center of mass of the group is the exact position of the transmitting AP.

(e) Another cost metric may be a calculation of the uniformity of angle between the transmitting AP and each candidate AP to be included in the group with the transmitting AP. This ensures that an area being serviced by the transmitting AP is surrounded by APs at many different angles from the transmitting AP in order to provide optimal location performance. This metric can replace or be combined with the center of mass metric to determine grouping. Thus, the second cost metric can be based further on a uniformity of angle between the wireless access point that transmits during a given time slot and the wireless access points that are not transmitting during the given time slot.

The cost metric for angle uniformity from a candidate AP to a transmitting AP may be defined as follows:

Let AP(n) represent the nth AP in a group of N APs that is being considered to be grouped with the transmitting AP, AP_tx.

Calculate the angle on the XY floorplan of each AP(n) to AP_tx:

angle(AP(n),AP_tx)=a tan 2(AP_tx.yInFt-AP(n).yInFt,AP_tx.xInFt-AP(n).xInFt), where a tan 2( ) is the quadrant aware inverse tangent function, AP.xInFt is the X location in the floor plan for an AP and AP.yInFt is the Y location in feet on the floorplan.

After the angle calculation, the angles to all the AP(1:N) are sorted and the difference is taken:

sortedDifferenceInAngles(AP(1:N),AP_tx)=diff(sort(angle(AP(1:N),AP_tx)), where sort( ) is the sort function to sort by smallest to largest angle and diff( ) is the difference function that takes the difference between each adjacent value in the sorted set. The final metric could take the form of:

angleUniformityMetric(AP(1:N),AP_tx)=min(sortedDifferenceInAngles(AP(1:N),AP_tx))/max(sortedDifferenceInAngles(AP(1:N),AP_tx)).

A sum of the metrics for all AP groups is computed and simulated annealing is used to find a global minimum over several iterations.

Figure 7:
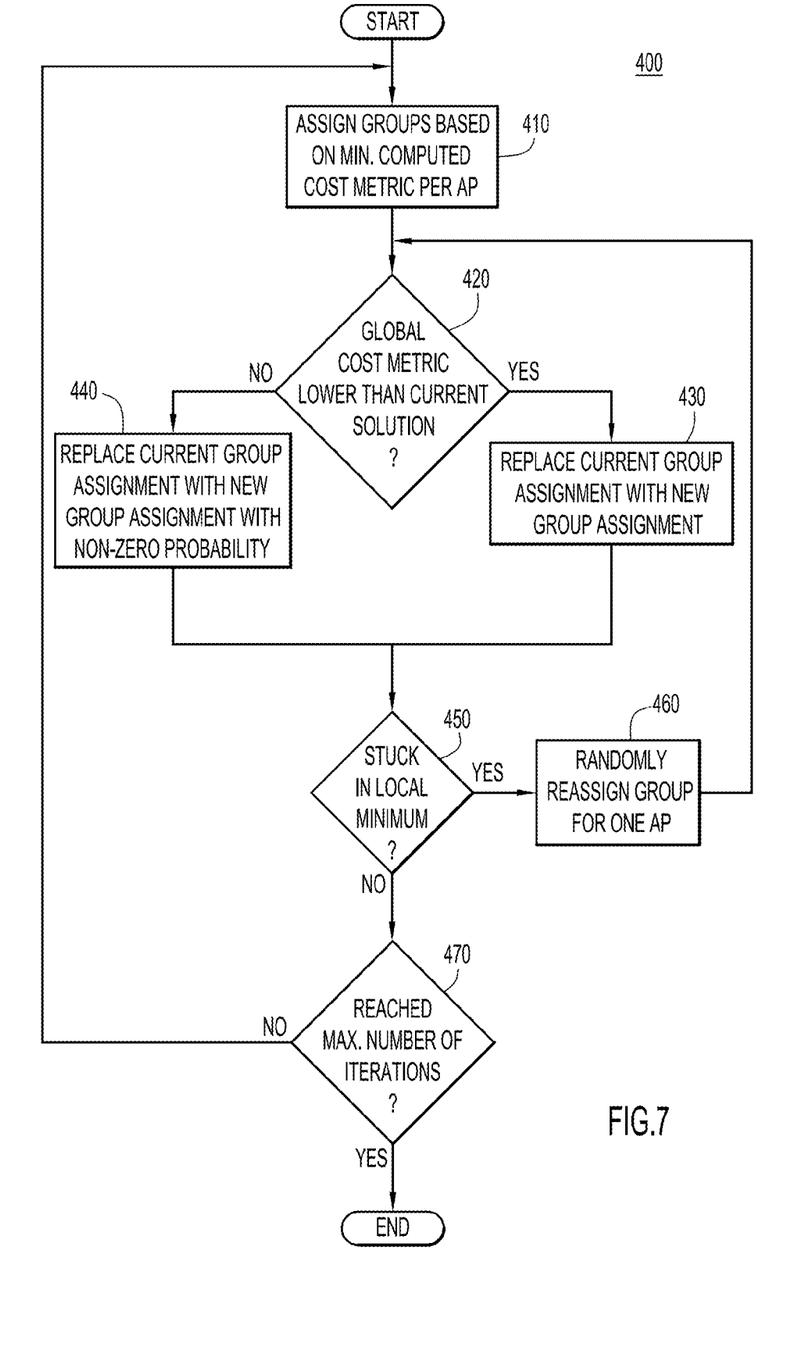
FIG. 7 is a flow chart of a process for determining an optimum group assignment for wireless access points, according to an example embodiment.

FIG. 7 illustrates a flow chart, similar to the flow chart of FIG. 4, for a process 400 for assigning APs to groups. At 410, each AP is assigned a group depending on which slot minimizes the cost metric for that AP. A global cost metric is computed as the sum of each individual cost metric of all APs in the system. At 420, it is determined whether the global cost metric is lower than the metric for the current AP group assignment scheme/solution. If the global cost metric is less than the metric for the current AP assignment scheme/solution, the current AP assignment scheme is replaced with a new group assignment at 430. On the other head, if the global cost metric is greater than the metric for the current AP assignment scheme/solution, then at 440, the current AP group assignment scheme is replaced with a new AP group assignment scheme with non-zero probability.

This global metric is then minimized using a simulated annealing heuristic over several iterations. If at 450 it is determined that the cost metric for the system is found in a local minimum, the group assignment of a single AP is randomly altered and the metric is recomputed at 460. The process then repeats from 420. The AP group assignment scheme is chosen as that with minimum cost found over several iterations, as indicated at 470.

The transmitting/active AP varies from transmit time slot to transmit time slot. Therefore, there are unique AP groups formed for every time slot. This means that each AP will potentially scan a unique set of channels over X time slots. Additionally, the AP will also need information about which AP is transmitting the LMAF for a given time slot, in order to further avoid possible contention from multiple APs within the same transmit slot.

Example of pseudo-code representing the process 400 for finding an AP group assignment for all APs that are not transmitting LMAFs during a given time slot is as follows.

```
For each slot k
    For each iteration i
        There are M(m1...mM) APs transmitting on slot k; and
        N(n1..nN)
        APs not transmitting on slot k (M+N=total_APs).
        Compute assignment priority based on APs in contention to
        listen to transmission according to group_radius
        (= 2*neighbor_radius).
        Compute metric between all N APs not transmitting on slot k
        and M APs transmitting on slot k as follows:
            Randomly choose AP from highest priority group not
            transmitting, nj.
                Metric(APnj,APmx)=distance between APs
                + group_weight + Center Of Mass distance from AP
                location
        Stop when all APs are assigned
        Stop when minimum group_count_requirement is met or
        iterations are done.
```

Figure 8:
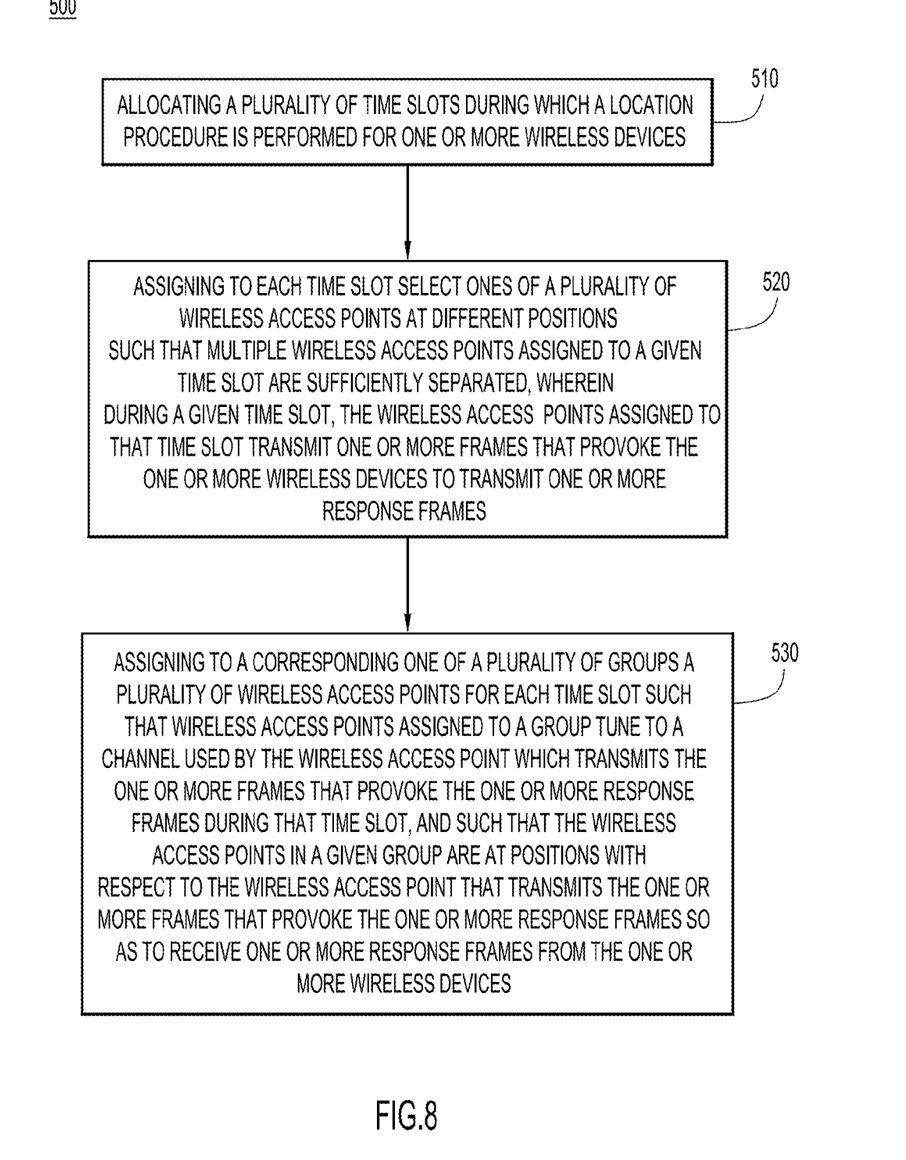
FIG. 8 is a high-level flow chart depicting operations performed to assign access points to transmit time slots and to assign access points to groups, according to an example embodiment.

Reference is now made to FIG. 8. FIG. 8 illustrates a high-level flow chart for a process 500 according to the embodiments presented herein. At 510, a plurality of time slots are allocated, during which a location procedure may be performed for one or more wireless devices. At 520, select ones of a plurality of wireless access points at different positions are assigned to time slots such that multiple wireless access points assigned to a given time slot are sufficiently separated, as described above. During a given time slot, the wireless access point assigned to that time slot transmits one or more frames that are intended to provoke the one or more wireless devices to transmit one or more response frames. As described above in connection with FIGS. 2-4, assigning access points to time slots is based on a first cost metric computed for each wireless access point. The first cost metric is based on a pathloss between wireless access points that are using the same time slot to ensure that neighboring wireless access points are not assigned to the same time slot, and wherein the first cost metric increases if more wireless access points are assigned to a given time slot. Moreover, a global cost metric is computed as a sum of each individual first cost metric for the plurality of wireless access points. The global cost metric is minimized using a simulated annealing heuristic over a plurality of iterations of time slot assignments. A time slot assignment scheme is selected among the plurality of wireless access points that is determined to have a minimum global cost metric over the plurality of iterations of time slot assignments. If the global cost metric is determined to be at a local minimum, a time slot assignment for a given wireless access point is randomly altered and the time slot assignment scheme is repeated.

At 530, an assignment is made of wireless access points to a corresponding one of a plurality of groups a plurality of wireless access points for each time slot such that wireless access points assigned to a group tune to a channel used by the wireless access point that transmits the one or more frames that are intended to provoke the one or more response frames from the one or more wireless devices, and such that the wireless access points in a given group are at positions with respect to the wireless access point that transmits the one or more frames that are intended to provoke the one or more response frames from the wireless devices so as to receive one or more response frames from the one or more wireless devices. As described above in connection with FIGS. 5-8, assigning wireless access points to a corresponding one of a plurality of groups is based on a second cost metric. The second cost metric is based on (a) a proximity of wireless access points that are not transmitting during a given time slot to wireless access points that are transmitting during the given time slot, (b) a number of neighboring wireless access points currently assigned to a given group, (c) a contribution of a wireless access point to a center of mass of a given group and distance of the center of mass of a given group to an actual location of a wireless access point that is assigned to a time slot. Furthermore, a global cost metric is computed from a sum of second cost metrics computed over a plurality of iterations of group assignments for every time slot. The global cost metric is minimized using a simulated annealing heuristic over the plurality of iterations of group assignments for every time slot.

Further still, the wireless access point that is assigned to transmit during a time slot may further transmit an announcement frame prior to transmitting the one or more frames that are intended to provoke the one or more response frames. The announcement frame contains information identifying the one or more wireless devices to be located.

Operations 510, 520 and 530 may be performed by a server (e.g., mobility services server 50 or WLAN controller 40 shown in FIG. 1) that is in communication with the plurality of wireless access points and which has access to information for the number of time slots used by the system, positions of the plurality of wireless access points, and the operating channels for each of the plurality of wireless access points. The server sends information indicating time slot assignments and group assignments to each of the plurality of wireless access points.

Figure 9:
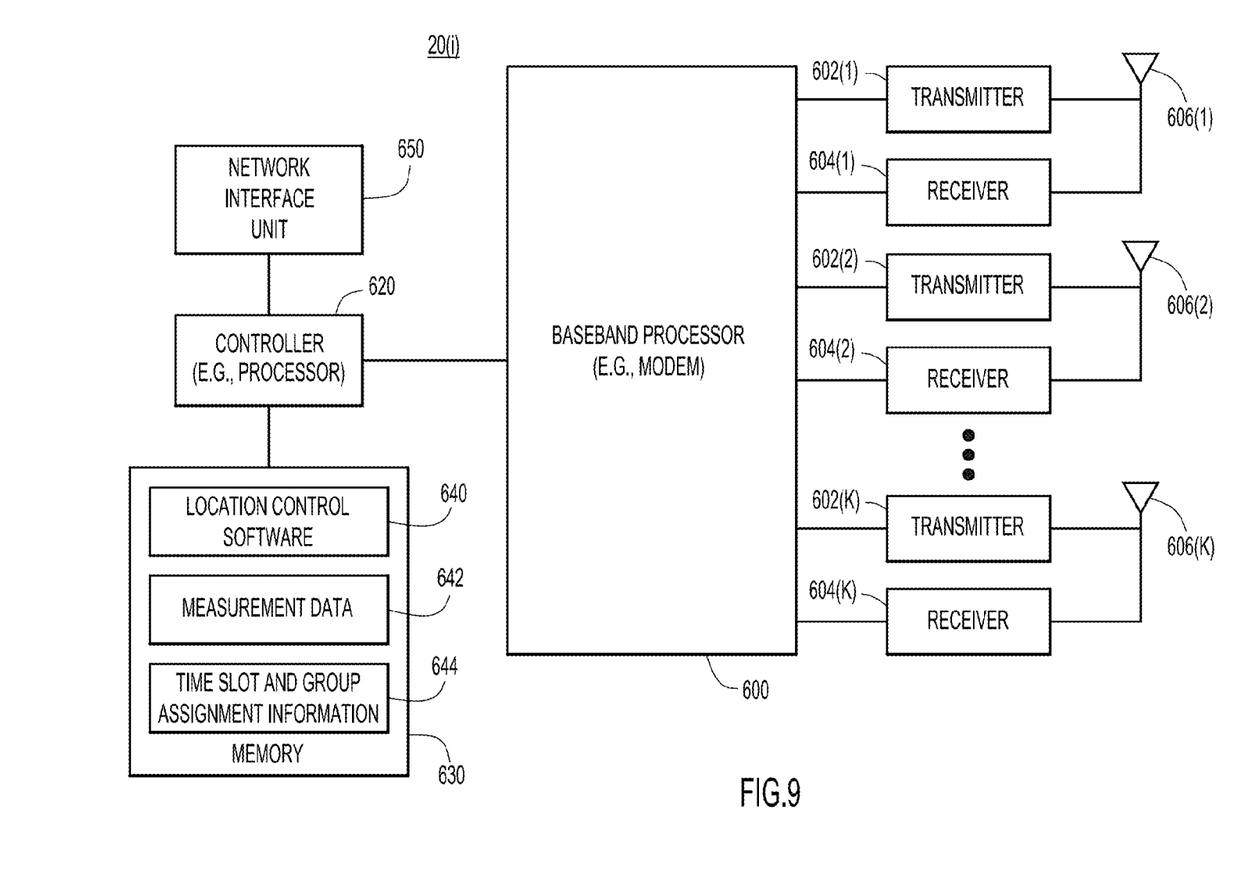
FIG. 9 is a block diagram of a wireless access point, according to an example embodiment.
Figure 10:
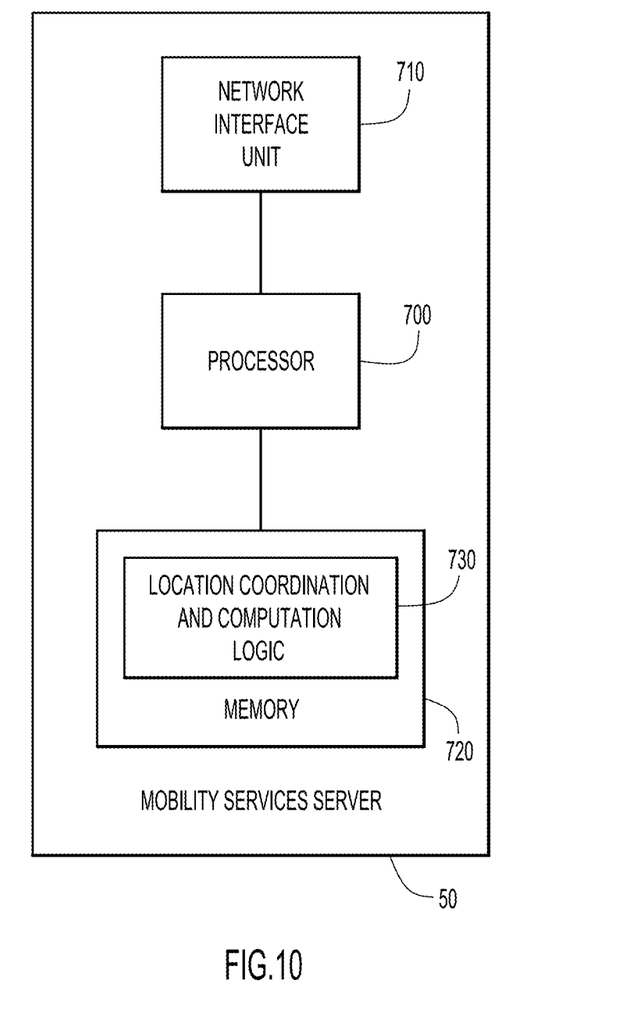
FIG. 10 is a block diagram of a server configured to perform the methods presented herein, according to an example embodiment.

Reference is now made to FIG. 9 that shows a block diagram of a wireless device, e.g., an AP, capable of performing operations related to the embodiments presented herein. The AP shown in FIG. 10 is identified generally by reference numeral 20(*i*) and is representative of any of the APs shown in FIG. 1.

The AP 20(*i*) includes a baseband processor (e.g., modem) 600, a plurality of transmitters 602(1)-602(K), a plurality of receivers 604(1)-604(K), a plurality of antennas 606(1)-606(K), a controller 620 and a memory 630. Each transmitter 602(1)-602(K) is connected to a corresponding one of the plurality of antennas 606(1)-606(K), and likewise each receiver 604(1)-604(K) is connected to a corresponding one of the plurality of antennas 606(1)-606(K). The baseband processor 600 performs various baseband transmit and receive operations necessary to comply with a wireless communication standard, for example, such as IEEE 802.11. The baseband processor 300 includes logic needed for FFT and other related computations made based on reception of an orthogonal frequency division multiplexed (OFDM) signal that comprises a plurality of subcarriers that span a frequency bandwidth of a received transmission.

The baseband processor 600 may be implemented by fixed or programmable digital logic gates, such as in the form of an application specific integrated circuit (ASIC), or may be implemented by a dedicated digital signal processor, microprocessor or microcontroller. The various functional blocks of the baseband processor 600 may be implemented by digital logic gates or by instructions executed by a microprocessor.

The controller 620 is coupled to the baseband processor 600 and provides higher level control for the AP 20(*i*). The controller 620 may be a microprocessor or microcontroller. The memory 630 stores instructions that the controller 620 executes to perform the control functions of the AP 20(*i*). Among these functions are operations performed when the controller 620 executes the location control software 640 stored in memory 630. In addition, the memory 630 stores location measurement data 642 (obtained from reception of signals from one or more wireless clients during a location procedure), as well as time slot and group assignment information 644 received from the WLAN controller 40 or mobility services server 50.

The memory 630 may include read only memory (ROM), random access memory (RAM), magnetic disk storage media devices, optical storage media devices, flash memory devices, electrical, optical, or other physical/tangible memory storage devices. Thus, in general, the memory 630 may include one or more tangible (non-transitory) computer readable storage media (e.g., a memory device) encoded with software comprising computer executable instructions and when the software is executed (by the controller 620) it is operable to perform the operations described herein.

The AP 20(*i*) further includes a network interface unit 650, e.g., an Ethernet card, which enables the AP 20(*i*) to communicate over a wired network. The network interface unit 650 thus enables the AP 20(*i*) to receive commands and data from the WLAN controller 40 or mobility services server 50, and to send data, such as measurement data from a location procedure, to the WLAN controller 40 or mobility services server 50.

Reference is now made to FIG. 10. FIG. 10 illustrates a block diagram of the mobility services server 50, according to an example embodiment. The mobility services server 50 may take the form of a physical device, separate from the WLAN controller 40, or combined with the WLAN controller 40. Moreover, the mobility services server 50 may take the form of an application running in a data center or cloud-computing environment. The mobility services server 50 includes a processor 700, a network interface unit 710 and a memory 720. The processor 700 may be a microprocessor or microcontroller, or several instances of such devices. The network interface unit 710 may include one or more network interface cards that enable network connectivity for the mobility services server 50 to communicate with the APs in a wireless network deployment, and to communicate with a network administrator application. The memory may 720 may take any of the forms of the memory described above in connection with FIG. 9. Location coordination and computation software 730 includes instructions stored in memory 720 that, when executed by the processor 700, cause the processor to perform various operations described above in connection with FIGS. 1-9, as well as to compute a location estimate for one or more wireless clients. Thus, the processor 700, when it executes the location coordination and computation software 730, may perform operations of process 500 described above in connection with FIG. 9.

To summarize, the techniques presented herein minimize overall latency in terms of the way the off-channel scanning works, and introduce coordination for the better use of location measurement resources. These techniques avoid the need for sequential scanning through a channel list, thereby reducing the overall latency between successive location computations because is not necessary for the APs to scan through an entire channel list.

While the techniques presented herein have been described with respect to a WLAN, this is not meant to be limiting. These techniques are applicable to any location procedure in which wireless transmissions from a target device are received at a plurality of antennas (e.g., an antenna array) of one or more wireless device.

In one form, a method is provided comprising: allocating a plurality of time slots during which a location procedure is performed for one or more wireless devices; assigning to each time slot select ones of a plurality of wireless access points at different positions such that multiple wireless access points assigned to a given time slot are sufficiently separated, wherein during a given time slot, the wireless access points assigned to the given time slot transmit one or more frames that are intended to provoke the one or more wireless devices to transmit one or more response frames; and assigning to a corresponding one of a plurality of groups a plurality of wireless access points for each time slot such that wireless access points assigned to a group tune to a channel used by the wireless access point which transmits the one or more frames that are intended to provoke the one or more response frames from the one or more wireless devices, and such that the wireless access points in a given group are at positions with respect to the wireless access point that transmits the one or more frames that are intended to provoke the one or more response frames so as to receive one or more response frames from the one or more wireless devices.

In another form, an apparatus is provided comprising: An apparatus comprising: a network interface unit that enables network communication with a plurality of wireless access points that serve wireless devices; a processor coupled to the network interface unit, wherein the processor: allocates a plurality of time slots during which a location procedure is performed for one or more wireless devices; assigns to each time slot select ones of a plurality of wireless access points at different positions such that multiple wireless access points assigned to a given time slot are sufficiently separated, wherein during a given time slot, the wireless access points assigned to the given time slot transmit one or more frames that are intended provoke the one or more wireless devices to transmit one or more response frames; and assigns to a corresponding one of a plurality of groups a plurality of wireless access points for each time slot such that wireless access points assigned to a group tune to a channel used by the wireless access point which transmits the one or more frames that are intended to provoke the one or more response frames from the one or more wireless devices, and such that the wireless access points in a given group are at positions with respect to the wireless access point that transmits the one or more frames that are intended to provoke the one or more response frames so as to receive one or more response frames from the one or more wireless devices.

In still another form, a non-transitory computer readable storage media is provided encoded with instructions that, when executed by a processor, cause the processor to perform operations comprising: allocating a plurality of time slots during which a location procedure is performed for one or more wireless devices; assigning to each time slot select ones of a plurality of wireless access points at different positions such that multiple wireless access points assigned to a given time slot are sufficiently separated, wherein during a given time slot, the wireless access points assigned to the given time slots transmit one or more frames that are intended to provoke the one or more wireless devices to transmit one or more response frames; and assigning to a corresponding one of a plurality of groups a plurality of wireless access points for each time slot such that wireless access points assigned to a group tune to a channel used by the wireless access point which transmits the one or more frames that are intended to provoke the one or more response frames from the one or more wireless devices, such that the wireless access points in a given group are at positions with respect to the wireless access point that transmits the one or more frames that are intended to provoke the one or more response so as to receive one or more response frames from the one or more wireless devices.

In still another form, a system is provided comprising a plurality of wireless access points at different geographical locations, and that serve wireless devices, and a server that is in communication with the plurality of wireless access points. The server allocates a plurality of time slots during which a location procedure is performed for one or more wireless devices; assigns to each time slot select ones of a plurality of wireless access points at different positions such that multiple wireless access points assigned to a given time slot are sufficiently separated, wherein during a given time slot, the wireless access points assigned to the given time slot transmit one or more frames that are intended provoke the one or more wireless devices to transmit one or more response frames; and assigns to a corresponding one of a plurality of groups a plurality of wireless access points for each time slot such that wireless access points assigned to a group tune to a channel used by the wireless access point which transmits the one or more frames that are intended to provoke the one or more response frames from the one or more wireless devices, and such that the wireless access points in a given group are at positions with respect to the wireless access point that transmits the one or more frames that are intended to provoke the one or more response frames so as to receive one or more response frames from the one or more wireless devices. The server sends to the plurality of wireless access points information indicating time slot assignments and group assignments, as well as identities of each AP assigned to transmit in each time slot.

The above description is intended by way of example only. Various modifications and structural changes may be made therein without departing from the scope of the concepts described herein and within the scope and range of equivalents of the claims.

What is claimed is:

1. A method comprising:
    allocating a plurality of time slots during which a location procedure is performed for one or more wireless devices;
    assigning to each time slot select ones of a plurality of wireless access points at different positions based on a first cost metric computed for each wireless access point such that multiple wireless access points assigned to a given time slot are sufficiently separated, wherein during the given time slot, the wireless access points assigned to the given time slot transmit one or more frames that are intended to provoke the one or more wireless devices to transmit one or more response frames; and
    assigning to a corresponding one of a plurality of groups a plurality of wireless access points for each time slot based on a second cost metric such that wireless access points assigned to a group tune to a channel so as to listen to the channel used by the wireless access point in the group which transmits the one or more frames that are intended to provoke the one or more response frames from the one or more wireless devices, and such that the wireless access points in a given group that tune to the channel are at positions with respect to the wireless access point in the given group that transmits the one or more frames that are intended to provoke the one or more response frames so as to receive one or more response frames from the one or more wireless devices,
    wherein the second cost metric is based on at least a contribution of a wireless access point to a center of mass of the given group of access points, and a distance of the center of mass of the given group to an actual location of the wireless access point that is assigned to transmit in a time slot, such that the center of mass of the given group is at the position of the wireless access point assigned to transmit.

2. The method of claim 1, wherein the wireless access point that is assigned to transmit during a time slot further transmits an announcement frame prior to transmitting the one or more frames that are intended to provoke the one or more response frames, wherein the announcement frame contains information identifying the one or more wireless devices to be located.

3. The method of claim 1, wherein the first cost metric is based on a pathloss between wireless access points that are using the same time slot to ensure that neighboring wireless access points are not assigned to the same time slot, and wherein the first cost metric increases if more wireless access points are assigned to a given time slot.

4. The method of claim 3, further comprising selecting a time slot assignment scheme among the plurality of wireless access points that is determined to have a minimum global cost metric over the plurality of iterations of time slot assignments.

5. The method of claim 3, wherein if the global cost metric is at a local minimum, further comprising randomly altering a time slot assignment for a given wireless access point.

6. The method of claim 1 further comprising:
computing a global cost metric as a sum of each individual first cost metric for the plurality of wireless access points;
minimizing the global cost metric using a simulated annealing heuristic over a plurality of iterations of time slot assignments.

7. The method of claim 1, wherein the second cost metric is further based on a proximity of wireless access points that are not transmitting during a given time slot to wireless access points that are transmitting during the given time slot, and a number of neighboring wireless access points currently assigned to a given group.

8. The method of claim 7, further comprising adjusting computation of the second cost metric to allow for a greater number of neighboring wireless access points to be assigned to a group.

9. The method of claim 7, wherein the second cost metric is based further on a uniformity of angle between the wireless access point that transmits during a given time slot and the wireless access points that are not transmitting during the given time slot.

10. The method of claim 7, further comprising:
computing a global cost metric from a sum of second cost metrics computed over a plurality of iterations of group assignments for every time slot; and
minimizing the global cost metric using a simulated annealing heuristic over the plurality of iterations of group assignments for every time slot.

11. The method of claim 1, wherein the allocating, first assigning and second assigning are performed by a server that is in communication with the plurality of wireless access points and which has access to information for the number of time slots used by the system, positions of the plurality of wireless access points, and the operating channels for each of the plurality of wireless access points.

12. The method of claim 11, further comprising:
sending from the server information indicating time slot assignments and group assignments to each of the plurality of wireless access points, as well as identities of each AP assigned to transmit in each time slot.

13. The method of claim 1, wherein the assigning to the plurality of groups results in groupings of wireless access points which vary in accordance with the second cost metric from time slot to time slot as the positions of the wireless access points assigned to transmit vary in accordance with the first cost metric from time slot to time slot.

14. An apparatus comprising:
a network interface unit that enables network communication with a plurality of wireless access points that serve wireless devices;
a processor coupled to the network interface unit, wherein the processor:
allocates a plurality of time slots during which a location procedure is performed for one or more wireless devices;
assigns to each time slot select ones of a plurality of wireless access points at different positions based on a first cost metric computed for each wireless access point such that multiple wireless access points assigned to a given time slot are sufficiently separated, wherein during the given time slot, the wireless access points assigned to the given time slot transmit one or more frames that are intended provoke the one or more wireless devices to transmit one or more response frames; and
assigns to a corresponding one of a plurality of groups a plurality of wireless access points for each time slot based on a second cost metric such that wireless access points assigned to a group tune to a channel so as to listen to the channel used by the wireless access point in the group which transmits the one or more frames that are intended to provoke the one or more response frames from the one or more wireless devices, and such that the wireless access points that tune to the channel in a given group are at positions with respect to the wireless access point in the given group that transmits the one or more frames that are intended to provoke the one or more response frames so as to receive one or more response frames from the one or more wireless devices,
wherein the second cost metric is based on at least a contribution of a wireless access point to a center of mass of the given group of access points, and a distance of the center of mass of the given group to an actual location of the wireless access point that is assigned to transmit in a time slot, such that the center of mass of the given group is at the position of the wireless access point assigned to transmit.

15. The apparatus of claim 14, wherein the wireless access point that is assigned to transmit during a time slot further transmits an announcement frame prior to transmitting the one or more frames that are intended to provoke the one or more response frames, wherein the announcement frame contains information identifying the one or more wireless devices to be located.

16. The apparatus of claim 14, wherein the first cost metric is based on a pathloss between wireless access points that are using the same time slot to ensure that neighboring wireless access points are not assigned to the same time slot, and wherein the first cost metric increases if more wireless access points are assigned to a given time slot.

17. The apparatus of claim 14, wherein the second cost metric is further based on a proximity of wireless access points that are not transmitting during a given time slot to wireless access points that are transmitting during the given time slot, and a number of neighboring wireless access points currently assigned to a given group.

18. The apparatus of claim 17, wherein the processor adjusts computation of the second cost metric to allow for a greater number of neighboring wireless access points to be assigned to a group.

19. The apparatus of claim 17, wherein the second cost metric is based further on a uniformity of angle between the wireless access point that transmits during a given time slot and the wireless access points that are not transmitting during the given time slot.

20. A non-transitory computer readable storage media encoded with instructions that, when executed by a processor, cause the processor to perform operations comprising:

allocating a plurality of time slots during which a location procedure is performed for one or more wireless devices;

assigning to each time slot select ones of a plurality of wireless access points at different positions based on a first cost metric computed for each wireless access point such that multiple wireless access points assigned to a given time slot are sufficiently separated, wherein during a given time slot, the wireless access points assigned to the given time slot transmit one or more frames that are intended to provoke the one or more wireless devices to transmit one or more response frames; and assigning to a corresponding one of a plurality of groups a plurality of wireless access points for each time slot based on a second cost metric such that wireless access points assigned to a group tune to a channel so as to listen to the channel used by the wireless access point in the group which transmits the one or more frames that are intended to provoke the one or more response frames from the one or more wireless devices, such that the wireless access points in a given group that tune to the channel are at positions with respect to the wireless access point in the given group that transmits the one or more frames that are intended to provoke the one or more response so as to receive one or more response frames from the one or more wireless devices, wherein the second cost metric is based on at least a contribution of a wireless access point to a center of mass of the given group of access points, and a distance of the center of mass of the given group to an actual location of the wireless access point that is assigned to transmit in a time slot, such that the center of mass of the given group is at the position of the wireless access point assigned to transmit.

21. The non-transitory computer readable storage media of claim 20, wherein the wireless access point that is assigned to transmit during a time slot further transmits an announcement frame prior to transmitting the one or more frames that are intended to provoke the one or more response frames, wherein the announcement frame contains information identifying the one or more wireless devices to be located.

22. The non-transitory computer readable storage media of claim 20, wherein the first cost metric is based on a pathloss between wireless access points that are using the same time slot to ensure that neighboring wireless access points are not assigned to the same time slot, and wherein the first cost metric increases if more wireless access points are assigned to a given time slot.

23. The non-transitory computer readable storage media of claim 20, wherein the second cost metric is further based on a proximity of wireless access points that are not transmitting during a given time slot to wireless access points that are transmitting during the given time slot, and a number of neighboring wireless access points currently assigned to a given group.

24. The non-transitory computer readable storage media of claim 23, further comprising instructions operable for adjusting computation of the second cost metric to allow for a greater number of neighboring wireless access points to be assigned to a group.

* * * * *